United States Patent
Agneeswaran et al.

(10) Patent No.: US 8,112,659 B2
(45) Date of Patent: Feb. 7, 2012

(54) REDUCING RECOVERY TIME FOR BUSINESS ORGANIZATIONS IN CASE OF DISASTERS

(75) Inventors: Vijay Srinivas Agneeswaran, Bangalore (IN); Hariprasad Nellitheertha Venkataraja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 272 days.

(21) Appl. No.: 12/487,818

(22) Filed: Jun. 19, 2009

(65) Prior Publication Data
US 2010/0325473 A1   Dec. 23, 2010

(51) Int. Cl.
*G06F 11/00* (2006.01)
(52) U.S. Cl. ............... 714/4.11; 714/4.12; 714/13
(58) Field of Classification Search .............. None
See application file for complete search history.

(56) References Cited

U.S. PATENT DOCUMENTS

| | | | | |
|---|---|---|---|---|
| 5,996,001 | A * | 11/1999 | Quarles et al. | 709/203 |
| 6,393,485 | B1 * | 5/2002 | Chao et al. | 709/231 |
| 6,597,956 | B1 * | 7/2003 | Aziz et al. | 700/3 |
| 7,080,378 | B1 * | 7/2006 | Noland et al. | 718/104 |
| 7,124,320 | B1 * | 10/2006 | Wipfel | 714/13 |
| 7,370,099 | B2 | 5/2008 | Hara et al. | |
| 2003/0233602 | A1 * | 12/2003 | Lindquist et al. | 714/47 |
| 2004/0064548 | A1 * | 4/2004 | Adams et al. | 709/224 |
| 2004/0103338 | A1 * | 5/2004 | Chalasani et al. | 714/4 |
| 2004/0243915 | A1 * | 12/2004 | Doyle et al. | 714/796 |
| 2004/0267920 | A1 * | 12/2004 | Hydrie et al. | 709/223 |
| 2006/0031843 | A1 | 2/2006 | Romero | |
| 2006/0190775 | A1 | 8/2006 | Aggarwal et al. | |
| 2008/0040535 | A1 | 2/2008 | Fisher et al. | |
| 2008/0126404 | A1 | 5/2008 | Slik et al. | |
| 2008/0250267 | A1 * | 10/2008 | Brown et al. | 714/4 |
| 2009/0006888 | A1 * | 1/2009 | Bernhard et al. | 714/6 |

OTHER PUBLICATIONS

"Applogic—Grid Operating System for Web Applications", "http://www.3tera.com/AppLogic/", Downloaded Circa: Oct. 24, 2008, pp. 1-1.

"Disaster Recovery for Core Network Services", "http://www.infoblox.com/solutions/disaster_recovery.cfm", Downloaded Circa: Oct. 24, 2008, pp. 1-3.

"Kato Masayuki", "Grid Technology Applied to Disaster Recovery", NEC Technical Journal, vol. 1, No. 4/2006, pp. 58-61.

"Here Comes the "Windows Cloud"", http://www.roughtype.com/archives/2008/10/amazons_cloud_n.php Downloaded Circa: Oct. 24, 2008, pp. 1-6.

(Continued)

*Primary Examiner* — Gabriel Chu
(74) *Attorney, Agent, or Firm* — Narendra Reddy Thappeta

(57) ABSTRACT

An aspect of the present invention reduces the recovery time for business organizations in case of disasters. In one embodiment, a disaster recovery system containing a primary site and a backup site (implemented as a cluster) is maintained. Application instances are executed in both the primary site and the backup site, with the number of instances executed on the backup site being fewer than that executed on the primary site. During normal operation, user requests received are processed using only the instances executing in the primary site, while the instances executing in the backup site are used in a standby state. On identifying that a disaster has occurred, the user requests received immediately after identification of the disaster are processed using only the instances executing in the backup site. The cluster at the backup site is then scaled out to add application instances until a desired level/percentage is achieved.

20 Claims, 4 Drawing Sheets

OTHER PUBLICATIONS

"Michael Haley", "Implications for Next Gen Networks and Grid Computing to Support IPTV and IMS Infrastructures", "ITU-T/OGF Workshop on NGN and Grids, Geneva", Dated: Oct. 2006, pp. 1-30.

"Timothy A. Guyre", and "Amir Hartman", "Making Enterprise Grid Computing a Reality With Oracle 10G Software", "ROI Realization Series", Dated: Dec. 2004, pp. 1-20.

"Paul Rad et al", "Optimizing Disaster Recovery Using Oracle Data Guard on Dell Poweredge Servers", Dated: Mar. 2004, pp. 57-58.

"Peter Szegedi" and "Magyar Telekom", "Signaling Architectures and Recovery Time Scaling for Grid Applications in IST Project MUPBED", "Optical Control Plane for Grid Networks ", "IEEE Communications Magazine", Publication Dated: Mar. 2006, pp. 74-82.

"Joseph E. Starzyk", "Virtualization for Disaster Recovery: Areas of Focus and Consideration", "IBM Global Technology Services", Dated: Mar. 2008, pp. 1-8.

* cited by examiner

FIG. 3A

| | 1001 | 1002 | 1003 | 1004 | Total |
|---|---|---|---|---|---|
| S1 | 5 | 10 | 10 | 5 | 30 |
| S2 | 8 | - | 2 | 5 | 15 |
| S3 | 4 | 3 | - | 6 | 10 |
| S4 | - | - | 2 | - | 5 |
| S5 | - | - | 5 | - | 5 |

| | 2001 | 2002 | Total |
|---|---|---|---|
| S1 | 3 | 2 | 5 |
| S2 | 2 | - | 2 |
| S3 | - | 1 | 2 |
| S4 | 1 | - | 1 |
| S5 | - | 1 | 1 |

| | 2001 | 2002 | 2003 | 2004 | Total |
|---|---|---|---|---|---|
| S1 | 4 | 4 | 5 | 5 | 18 |
| S2 | 3 | - | 3 | 3 | 9 |
| S3 | - | 4 | - | 2 | 6 |
| S4 | 3 | - | - | - | 3 |
| S5 | - | 3 | - | - | 3 |

380

REDUCING RECOVERY TIME FOR BUSINESS ORGANIZATIONS IN CASE OF DISASTERS

BACKGROUND OF THE INVENTION

1. Technical Field

The present disclosure relates to business continuity/disaster recovery planning and more specifically to reducing recovery time for business organization in case of disasters.

2. Related Art

Business organizations often require that operations (or at least the critical ones) of the organization be kept running in the event of disasters (natural or man-made) such as earthquakes, floods or major accidents/attacks, etc. In particular for business organizations involved in important public utility infrastructures like banking, power, telecommunication, health and financial industries, etc., such a requirement may be mandatory.

Disaster recovery systems are commonly used for providing continuity of operations of a business organization. A disaster recovery system typically includes a primary site containing systems that are used during the normal operations of the business organization as well as a backup site containing systems that are used during disaster situations. The backup site is generally located at a different geographical location from that of the primary site, to avoid the disaster from affecting both the sites.

When a disaster is declared (usually manually by an appropriate business authority) to have occurred associated with the primary site, the operations of the business organization are switched to the backup site to ensure continuity for the operations of the business organization. Such switching implies that the systems in the backup site may thereafter process user requests in the disaster duration, i.e., until the disaster is deemed to have ended or normal operation is restored at the primary site.

Recovery time refers to the time required for providing continuity of operations of the business organization in case of a disaster. In particular, recovery time refers to the duration between the time instants at which disaster associated with the primary site is declared and the first operation is handled by the backup site. A lower value for the recovery time ensures that the operations of the business organization are provided with maximum continuity/minimum break.

Different approaches have been used to lower the recovery time. In one approach, the systems at the backup site are kept in a shutdown/powered down state (as a "cold" site) to reduce the cost of maintenance of the backup site. As such, when a disaster occurs, the systems at the backup have to be manually powered up/started and the softwares initialized, which results in a large recovery time. In another approach, the backup site is maintained in a similar state to the primary site with all the required systems started and softwares initialized (as a "hot" site). Though such an approach results in lower recovery time, the cost of maintenance, in terms of money, labor, etc. of the backup site is considerably large.

Accordingly, it may be desirable to reduce the recovery time for disaster recovery systems, while overcoming some of the problems described above.

BRIEF DESCRIPTION OF THE DRAWINGS

Example embodiments of the present invention will be described with reference to the accompanying drawings briefly described below.

FIG. 3A represents a two-dimensional matrix depicting the state of the primary site during normal operation of the business organization in one embodiment.

FIG. 3B represents a two-dimensional matrix depicting the state of the backup site during normal operation of the business organization (as well as the initial state after disaster) in one embodiment.

FIG. 3C represents a two-dimensional matrix depicting the state of the backup site that has been scaled-out to a desired level (60% of the original number of instances executed at the primary site) after a disaster has occurred at the primary site in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

Figure 1:
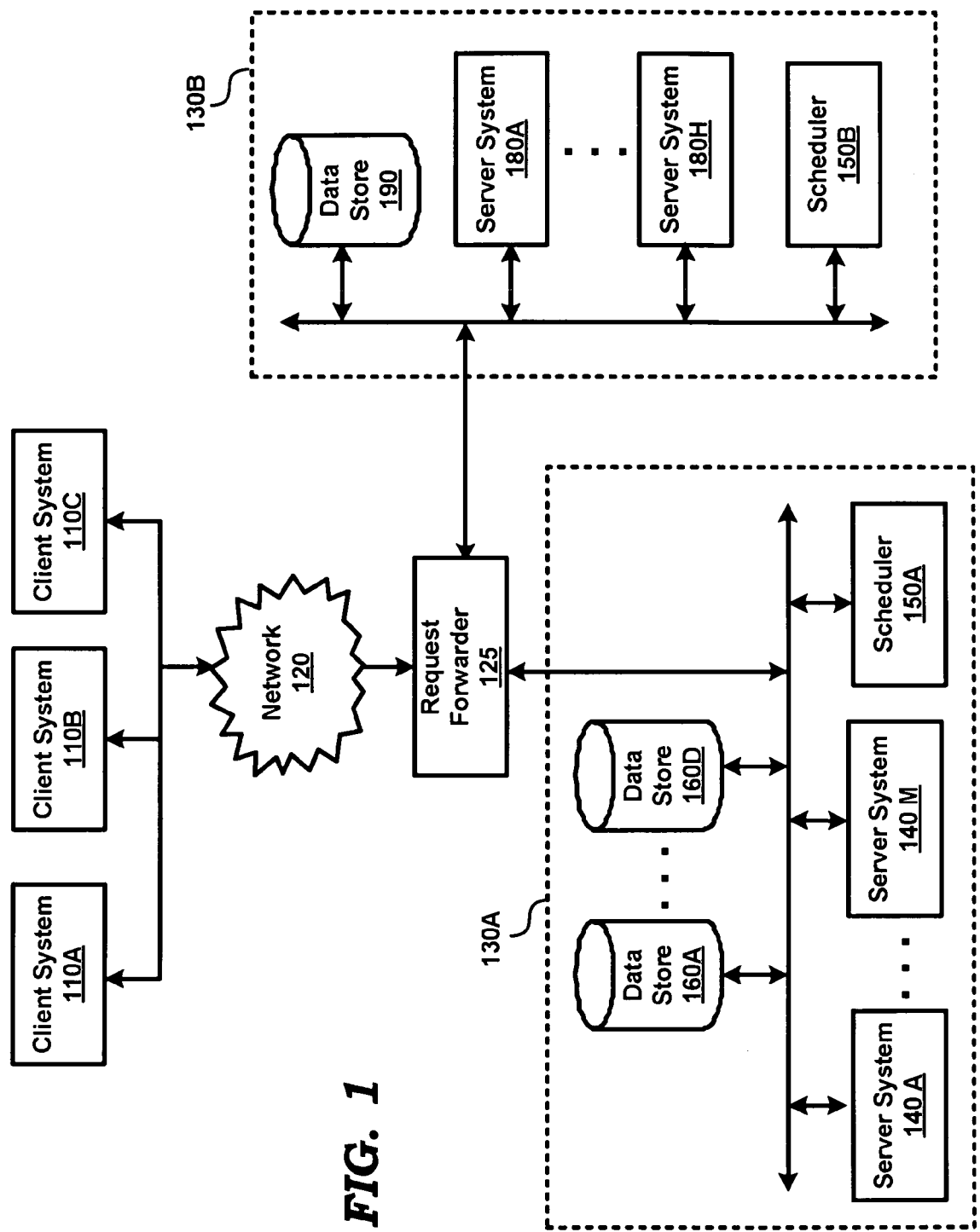
FIG. 1 is a block diagram illustrating an example environment (disaster recovery system) in which several aspects of the present invention can be implemented.

An aspect of the present invention reduces the recovery time for business organizations in case of disasters. In one embodiment, a disaster recovery system is maintained containing a first set of nodes at a primary site and a second set of nodes implemented as a cluster at a backup site. Application instances are executed on the first set and the second set of nodes during a normal operation of the business organization, with the number of instances executed on the second set of nodes being fewer than that executed on the first set of nodes.

User requests received during the normal operation are processed using only the application instances executing in the first set of nodes (primary site) with the application instances executing in the second set of nodes being used in a standby state during the normal operation. On identifying that a disaster has occurred associated with the primary site, the user requests received immediately after identification of the disaster are processed using only the instances executing in the second set of nodes (backup site).

Thus, the recovery time for the business organization is reduced due to executing application instances in a standby state during the normal operation and then processing user requests using the same application instances immediately after identification of the disaster.

In one embodiment, the continuity of the business organization is further enhanced by ensuring that at least one application instance of each of the application types (executing in the first set of nodes at the primary site) is also executed in the second set of nodes in the backup site during the normal operation. Accordingly, the backup site is capable of processing user requests directed to different application types that are received immediately after a disaster is declared.

According to another aspect of the present invention, the cluster at the backup site is scaled out to add a third set of nodes executing application instances, such that user requests received after the scaling out are processed using instances executing in both the second and third set of nodes during the duration of the disaster. The scaling out may be performed multiple times in a phased manner until the total number of application instances executing in the backup site equals a desired percentage of the number of application instances that were executing in the primary site before the disaster. For example, by using the desired percentage to be equal to 100, the execution state of the primary site can be recreated in the backup site.

According to one more aspect of the present invention, the first set of nodes at the primary site is implemented as another cluster (different from the cluster at the backup site). As such, a first scheduler at the primary site is designed to perform the actions of executing the corresponding number of application instances in the first set of nodes and also controlling the processing of user requests during normal operation of the business organization. A second scheduler at the backup site is designed to perform the actions of executing the corresponding number of application instances in the second set of nodes in a standby state, controlling the processing of user requests after a disaster is identified to have occurred and scaling out the cluster at the backup site.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

FIG. 1 is a block diagram illustrating an example environment (disaster recovery system) in which several aspects of the present invention can be implemented. The block diagram is shown containing client systems 110A-110C, network 120, request forwarder 125 and clusters 130A-130B. Cluster 130A (shown containing server systems 140A-140M, data stores 160A-160D, and scheduler 150A) represents the systems maintained at a primary site which are used during the normal operation of the business organization, while cluster 130B (shown containing server systems 180A-180H, data store 190, and scheduler 150B) represents the systems maintained at a backup site which are used during a disaster (and until normal operation is restored).

It should be noted that the systems at the backup site (cluster 130B) need to provide similar capability (but perhaps at a reduced scale, as described below) as the systems operating at the primary site (cluster 130A), for example, in terms of the software/services offered. The systems at the backup site may mostly be unused during normal operation of the business organization (though some of the systems at the backup site may be used for tasks such as synchronization of data between the primary and the backup sites).

Merely for illustration, only representative number/type of systems/clusters is shown in the Figure. Many environments often contain many more clusters (both at the primary and backup sites), in turn containing many more systems, both in number and type, depending on the purpose for which the environment is designed. Each system/device of FIG. 1 is described below in further detail.

Network 120 provides connectivity between client systems 110A-110C and request forwarder 125. Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Each of client systems 110A-110C represents a system such as a personal computer, workstation, mobile station, etc., used by users to generate (client) requests to enterprise applications/softwares executing in cluster 130A or 130B (primarily to cluster 130A during normal operation and to cluster 130B after a disaster is declared). The requests (for using specific services provided by the softwares) may be generated using appropriate user interfaces. In general, a client system requests an application/software for performing desired tasks/services and receives corresponding responses containing the results of performance/processing of the requested tasks/services.

Request forwarder 125 forwards each client request to either scheduler 150A of cluster 130A (during normal operation before a disaster) or to scheduler 150B of cluster 130B (after the disaster is declared). Though shown as a single block/unit, it may be appreciated that request forwarder 125 may contain several cooperatively operating independent systems, for redundancy, scalability and reliability. Similarly, request forwarder 125 may be coupled to each of the clusters 130A/130B by respective high speed network, though shown as a single line in the Figure. While the distribution of requests is described as being based on request forwarder 125 merely for illustration, it should be appreciated that various other well known techniques can be employed to deliver the client requests to the two sites (depending on normal or disaster mode, as described herein).

Each of clusters 130A-130B represents a group of servers/systems (i.e., "nodes") such as server systems, data stores, schedulers, etc. that work together to operate as a single server/system in providing services. In other words, users using client systems 110A-110C view each of clusters 130A-130B as a single system offering specific services (without being concerned regarding the individual nodes in the cluster).

Clusters are commonly used to improve the performance of services by having multiple nodes provide the same service, commonly to provide fault-tolerance by having redundant nodes and to provide fast response times by load balancing when servicing a large number of users. Clusters may include heterogeneous (i.e., having different hardware/software configuration) collections of nodes, that may be distributed geographically across multiple locations, and may sometimes be administered by unrelated organizations (for example, when the backup site is maintained by another business organization). Clusters providing desired quality of service (in terms of computing or data handling) to applications with open protocols and operating across organizational boundaries (termed "virtual organizations") are commonly referred to as "Grids" (with the technology termed as "Grid" computing). In the present application, the term cluster is used to cover grids, as well.

In one common implementation, the nodes in a cluster work in a tightly-coupled manner (wherein, data is shared among the nodes thereby requiring frequent communication among the nodes) for performing a single requested task/service. Accordingly, each cluster is designed to execute fewer tightly coupled computing intensive softwares/tasks such as weather simulations, (air/rail) traffic management, etc. Alternatively, each of the requested tasks/services may be performed using one or few nodes independently (without sharing data thereby requiring little or no inter-node communication).

Some of the typical (types of) nodes in a cluster, such as data stores, server systems, and scheduler as relevant to the understanding of the present invention are described in detail below. However, a cluster may contain more types and/or number (typically, in thousands) of nodes as will be apparent to one skilled in the relevant arts.

Each of data stores 160A-160D and 190 represents a non-volatile storage facilitating storage and retrieval of a collection of data by one or more enterprise applications/softwares executing in clusters 130A-130B, in particular in server systems 140A-140M and 180A-180H (typically while processing various client/user requests). Some of the data stores may be implemented using relational database technologies and therefore provide storage and retrieval of data using structured queries such as SQL (Structured Query Language). Other data stores may be implemented as file stores providing storage and retrieval of data in the form of one or more files organized as one or more directories, as is well known in the relevant arts.

Each of server systems 140A-140M and 180A-180H executes application instances, designed to process client requests. Thus, each application instance is implemented with the program logic to process the corresponding client request. It should be appreciated that the same application type (e.g., a payroll management application) is often executed as multiple instances (typically on different servers, but multiple instances can be executed in the server, but on different virtual machines) for reasons such as scalability, partitioning by different customer entities, etc.

Execution of each application instance may require execution of other software entities. For example, each server may be designed to execute an application instance in the context of a virtual machine (VM) only. Java Virtual Machine (JVM) available from Sun Microsystems and VMWare Workstation available from EMC Corporation, etc., are examples of such virtual machines. Some of the VMs (e.g., JVM) may in turn execute on top of a base/common operating system, but provide an operating environment such that the application instances have a view of operating on a self-contained machine (though shared by multiple VMs) on a reduced scale (compared to the aggregate/total resources available).

Each of scheduler's 150A-150B represents a server system which acts as a coordinator of the other systems in the cluster. Each scheduler typically executes management software programs such as load balancer, fail-over manager, etc., which co-ordinate/mediate the activities/execution of the multiple instances of the software programs, in particular, the enterprise applications in server systems 140A-140M and 180A-180H.

Each scheduler is designed as a point of access (in the cluster) for receiving user requests from client systems 110A-110C and distributing the requests to the appropriate application/software instances. Accordingly, each scheduler may maintain information indicating which of the nodes (and/or the application instances) are currently available/ready for processing user requests. Each scheduler may further facilitates adding, removing and/or upgrade of nodes (and/or the application/software instances) based on the requirements of the business organization such as the number of the user requests that need to be simultaneously processed, the response time desirable for each user request, etc.

In one embodiment, each scheduler receives TCP/IP packets (corresponding to the user requests) from request forwarder 125 that have destination address equal to the IP address of the schedulers and distributes the requests using packets having the destination address of the packets to the IP addresses of the respective server systems (executing the specific application instances) processing the user requests.

It may be appreciated that though each of clusters 130A-130B is shown containing only a single scheduler, in alternative embodiments, each cluster may contain multiple schedulers which closely operate together (in "conjugation") to coordinate the activities/services of the other systems in the cluster. Furthermore, schedulers in different clusters (for example, 150A and 150B) may also be configured to operate together in conjugation with each other.

Thus, a disaster recovery system is provided for a business organization, which includes cluster 130A located at the primary site being responsible for the normal operations (e.g. processing user requests), and cluster 130B located at the recovery site being responsible for the operations in the event of a disaster.

In the event of a disaster, it may be desirable that the recovery time for the business organization (from the time instant at which disaster is declared to have occurred at cluster 130A to the time instant at which the first user request is processed by cluster 130B) be as low as possible. Several aspects of the present invention reduce recovery time for business organizations in case of a disaster as described below with examples.

3. Reducing Recovery Time for Business Organizations

Figure 2:
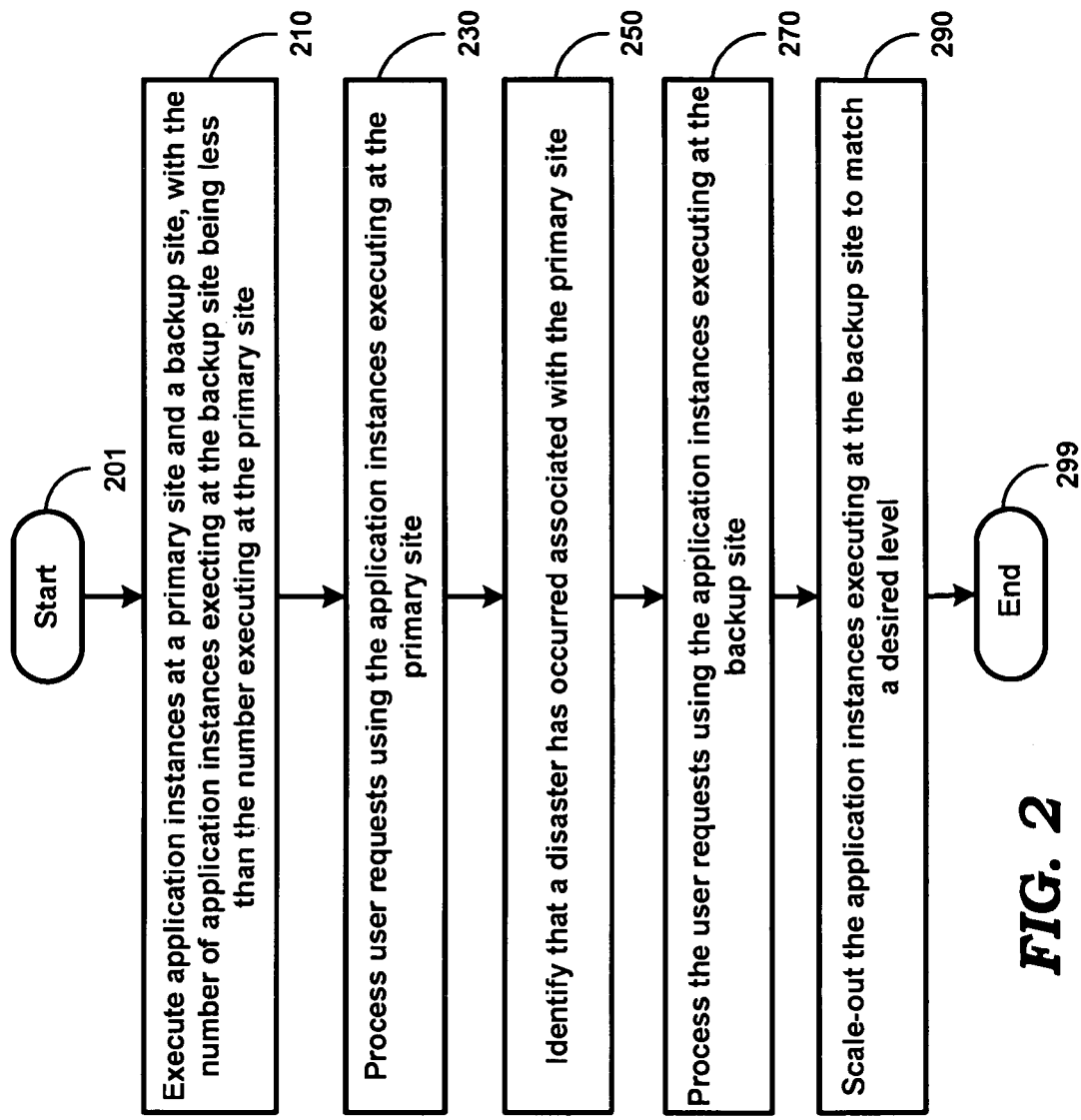
FIG. 2 is a flow chart illustrating the manner in which the recovery time for business organizations in case of a disaster is reduced according to an aspect of the present invention.

FIG. 2 is a flow chart illustrating the manner in which the recovery time for business organization in case of a disaster is reduced according to an aspect of the present invention. The flowchart is described with respect to FIG. 1 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, multiple applications instances (designed to process user requests) are executed at the primary site (cluster 130A) and the backup site (cluster 130B), with the number of application instances executing at the backup site being less than the number executing at the primary site. The application instances may be executed in the respective server systems 140A-140M and 180A-180H contained in clusters 130A and 130B, with the corresponding schedulers 150A and 150B controlling the number of application instances executed in the respective clusters.

An application instance represents a single execution copy of the application type in memory, which operates independently (though data/code modules may be shared) of the other instances/copies of the same enterprise application. Accordingly, each instance is capable of processing the user requests independent of the other instances of the same application. As such, multiple instances of the same enterprise application may be executed to facilitate processing of greater number of user requests (directed to the application).

In one embodiment, the application instances are executed in the context of virtual machines (VMs) executing at nodes in the cluster. The VMs may be configured to automatically start execution of a pre-defined number of application instances. Accordingly, execution of mulitple application instances may entail initialization/starting the execution of a corresponding number of VMs at each of the sites.

It may be appreciated that the application instances executing in the server systems/data stores at the primary/backup sites may be of different application types such as number crunching applications, that are designed to process user requests. The number of application instances (and the specific application types) to be executed in each of the nodes (which collectively represents the "execution state") at the backup site (as well as the primary site) can be chosen based on the requirements of the business organization. For example, one instance of each enterprise application type may be chosen to be executed at the backup site to to provide continuity of the operations of the business organization. However, executing more instances at the backup site may help in processing more user requests quickly upon occurrence of disaster.

It may be appreciated that executing a lesser number of application instances at the backup site entails usage of only a few systems in cluster 130B (for example, scheduler 150B and some of server systems 180A-180H) with the other systems possibly in a shutdown/powered down state. Accordingly the cost of maintenance is considerably less than that required for maintaining the backup site as a hot site (similar to the primary site).

In general, the backup site can be viewed as executing a "scaled-in" version of the application instances as compared to the primary site, wherein scale-in refers to the process of removing nodes/instances from a cluster such that the removed nodes/instances are not available for processing future user/service requests.

In step 230, user requests are processed using the applications instances executing at the primary site (cluster 130A) during the normal operations of the business organization. Thus, request forwarder 125 may be designed to pass/forward all client/user requests to scheduler 150A during normal operation. Thus, based on information whether there is a disaster situation or normal operation is in progress, request forwarder 125 may forward the requests to scheduler 150A during normal operation. Scheduler 150A may then further forward each request to a suitable application instance, to process the corresponding request.

Thus, during normal operation, the application instances (and the corresponding nodes) executing at the backup site do not process user requests (due to request forwarder 125 not forwarding the requests), and thus are viewed/said to be used in a standby state. The scheduler 150B at the backup site is also viewed as being used in a standby state. In general, a node executing application instances which are used in standby state is also said to be used in standby state.

In step 250, a disaster is identified to have occurred associated with the primary site. In one common scenario, the disaster is manually declared (by an authority of the business organization) to have occurred at the primary site and accordingly a recovery notification is sent to the backup site (for example, to scheduler 150B). It may be appreciated that a primary site may be affected directly or indirectly by a disaster (for example, when a power grid providing power to the primary site goes down). In general, a disaster may be identified when the systems at the primary site are unable to process any further user requests.

In an alternative embodiment, request forwarder 125 determines whether a disaster has occurred at the primary site, for example, by checking network connectivity/acessibility of various systems (such as scheduler 150A) at the primary site. Request forwarder 125 may then determine that a disaster has occurred if scheduler 150A (or any other node in the primary site) is not reachable (in terms of network accessibility).

For example, request forwarder 125 may regularly "ping" scheduler 150A to determine the status of scheduler 150A. In a scenario that a pre-determined number of "pings" are missed (not responded to) by scheduler 150A or alternatively no response is received for a pre-defined duration of time, request forwarder 125 may determine that scheduler 150A is not reachable and accordingly that a disaster has occurred. In yet another embodiment, scheduler 150A may be designed to send regularly (e.g. every 5 minutes) an "active" signal to the request forwarder 125, with request forwarder 125 determining that a disaster has occurred if the "active" signal is not received for a specific time period (e.g., 1 hour) or a certain number of times (e.g. 50 times).

In step 270, user requests are processed using the applications instances already executing (initialized in step 210) at the backup site (cluster 130B) after the disaster is identified to have occurred. Thus, request forwarder 125 may start forwarding user requests to scheduler 150B soon after identification of the disaster situation. As user application instances are already executing, scheduler 150B may start distributing user requests for processing to the appropriate server systems 180A-180H/application instances in backup site (cluster 130B) immediately after the determination of disaster.

Thus the processing of user requests may resume (after occurrence of disaster rendering cluster 130A incapable of processing the user requests) as soon as the disaster is identified to have occurred and request forwarder 125 is configured to route the packets (forming the user requests) to scheduler 150B.

However, the time duration/recovery time between the time instant at which the disaster is identified (in step 250) and processing of the first user request (in step 270) is still generally low, as the application instances are already executing on the nodes in the backup site (thereby avoiding the time required to power up the nodes and/or initialize the application instances).

In step 290, the application instances executing at the backup site (cluster 130B) are scaled-out to match a desired level. Scale-out refers to the process of adding nodes/instances to a cluster such that future user/service requests can be processed using the newly added nodes/instances. The scaling-out of cluster 130B may be performed by scheduler 150B preferably after the processing of user requests has been immediately started by the already executing application instances.

In one embodiment, scale-out of the application instances is performed by scaling-out the number of virtual machines (VMs) executing at the backup site (cluster 130B) and executing application instances in the context of the VMs. The VMs may be configured to automatically start execution of a pre-defined number/type of application instances and thus scaling out may merely entail scaling out the VMs.

It is generally desirable that the number of application instances executing at the backup site be scaled out to match the original number of instances executed at the primary site, for example, when the execution state at the primary site is required to be recreated at the backup site. However, in scenarios, where the backup site contains lesser number of systems/nodes as compared to the primary site, the desired level of the number of application instances to be executed at the backup site may be pre-specified by the business organization. For example, the business organization may specify that the desired level is 60% of the original number of instances executed at the primary site. The flowchart ends in step 299.

Thus, by executing application instances in a standby state during normal operation and then processing of user requests using the application instances immediately after identification of the disaster, the recovery time of the disaster recovery system of FIG. 1 provided for a business organization is reduced. The manner in which the steps of FIG. 2 are implemented in one embodiment is described below with examples.

4. Illustrative Example

FIGS. 3A-3C together illustrates the manner in which recovery time for a disaster recovery system (shown in FIG. 1) provided for a business organization is reduced in one embodiment. Each of the Figures is described in detail below.

FIG. 3A represents a two-dimensional matrix depicting the state of the primary site (cluster 130A) during normal operation of the business organization in one embodiment. Matrix 320 is shown containing columns 1001-1004, each of which represents the identifier of a corresponding node in cluster 130A, for example, one of server systems 140A-140M.

Each of rows S1-S5 represents a software/enterprise application type executing in the corresponding node at that time instance. Only representative identifiers of the software/application types are shown in FIG. 3, with the identifiers representing softwares such a Linux operating system available from Red Hat Corporation, Oracle database, E-Business Suite application both available from Oracle Corporation (intended assignee of the subject patent application), etc. In general, the identifiers "S1", "S2", etc. may identify any desired application types according to the requirements of the environment in which the features of the invention is sought to be implemented.

The number at the intersection of each row and column represents the number of instances of the software/application type that are executing (and processing requests) in the corresponding node. For example, the number 8 at the intersection of column 1001 and row S2 indicates that eight instances of the application type S2 are currently executed in the server system corresponding to the identifier 1001. A "–" (e.g., in column 1001 and row S4) value indicates that the corresponding node (1001) is not installed (executing) with the corresponding software/application type (S4). The number in the "Total" column for a specific row indicates the total number of instances of the corresponding software/application types executing at the primary site (cluster 130A).

Thus, matrix 320 indicates that there are totally 30 instances of the software application S1 executing at the primary site, with the instances being distributed between nodes 1001-1004, while there are 5 instances of the software application S5 which are all executed in node 1003. The multiple instances of the different applications may be processing user requests (or be ready for processing) at any given time based on the distribution of the requests made by scheduler 150A. The description is continued illustrating the state of the backup site during normal operation of the business organization.

FIG. 3B represents a two-dimensional matrix depicting the state of the backup site (cluster 130B) during normal operation of the business organization (as well as the initial state immediately after disaster) in one embodiment. Matrix 350 (and matrix 380 described below) is shown containing columns 2001-2004, each of which represents the identifier of a corresponding node in cluster 130B, for example, one of server systems 180A-180M. Each of rows S1-S5 represents a software/enterprise application installed in the corresponding node, with the number at the intersection provided similar to matrix 320 as described above.

Accordingly, matrix 350 indicates that there are two nodes 2001 and 2002 in cluster 130 which are executing a few instances of the applications S1-S5. It may be observed that matrix 350 does not contain columns corresponding to nodes 2003 and 2004, which are assumed to be shutdown/powered down. Further, it may be appreciated that the total number of instances of each software application executing in the backup site is less than the total number of instances executing in the primary site (as indicated by matrix 320). For example, only 5 instances of application S1 are executing in cluster 130B (the backup site) while 30 instances are executing in cluster 130A (the primary site).

Thus, different number of application instances is executed in the primary and backup sites. As described above, the different number/type of application instances may be executed in the context of virtual machines (VMs) executing in the nodes of clusters 130A-130B.

During normal operations of the business organization, only the instances at the primary site (matrix 320) process user requests, with the instances at the backup site (matrix 350) maintained in a standby state (without processing user requests). On identifying that a disaster has occurred, the processing of the user requests is immediately performed (within a short period of time) using the application instances executing at the backup site (matrix 350) since the application instances are already executing, thereby reducing the recovery time for the disaster recovery system of FIG. 1. Once the processing of requests has been successfully started, the application instances executing at the backup site are scaled-out to a desired level as described in detail below.

FIG. 3C represents a two-dimensional matrix depicting the state of the backup site (cluster 130B) that has been scaled-out to a desired level (60% of the original number of instances executed at the primary site) after a disaster has occurred at the primary site in one embodiment. The information of FIG. 3C represents a state in the duration of the disaster (until normal operation of the business organization is restored).

Matrix 380 indicates that there are four nodes 2001-2004 in cluster 130 which are executing instances of the applications S1-S5. It may be observed that the total number of instances of each software application executing in the backup site is 60% of the total number of instances that were executing in the primary site before disaster occurred (as indicated by matrix 320). For example, the backup site (matrix 380) is shown executing 18 instances of application S1 which is equal to 60% of the original 30 instances that were executing in the primary site (matrix 320) before disaster.

It may be appreciated that the scale-out of the application instances may be performed in a phased manner. Each phase of the scale-out may involve adding new nodes and/or executing new instances of the virtual machines (VMs)/applications. For example, during a first phase, the applications S3, S4 and S5 may be scaled-out to add respectively two new instances of S4 in node 2001, while adding two new instances of S3 and three new instances of S5 in 2002. During a second phase, cluster 130B may be scaled-out to add nodes 2003 and 2004 and further to add respective new instances of applications S1, S2 and S3 (for example, by adding new VMs). During a third phase, the application instances of S1 and S2 executing in nodes 2001 and 2002 are scaled-out to match the desired level.

It may be appreciated that the features of the invention are described above for a disaster recovery system wherein the nodes at the primary and backup sites are implemented as respective clusters. However, in one alternative embodiment, the nodes at the primary cluster are not implemented as a cluster, with only the nodes at the backup site being implemented as a cluster. Further, according to another aspect of the present invention, the nodes at the primary and backup site may be implemented as forming a single cluster, with a single scheduler (preferably at the backup site, such as scheduler 150B) providing several features of the present invention.

It should be further appreciated that the features described above can be implemented in various embodiments as a desired combination of one or more of hardware, software, and firmware. The description is continued with respect to an embodiment in which various features are operative when the software instructions described above are executed.

5. Digital Processing System

Figure 4:
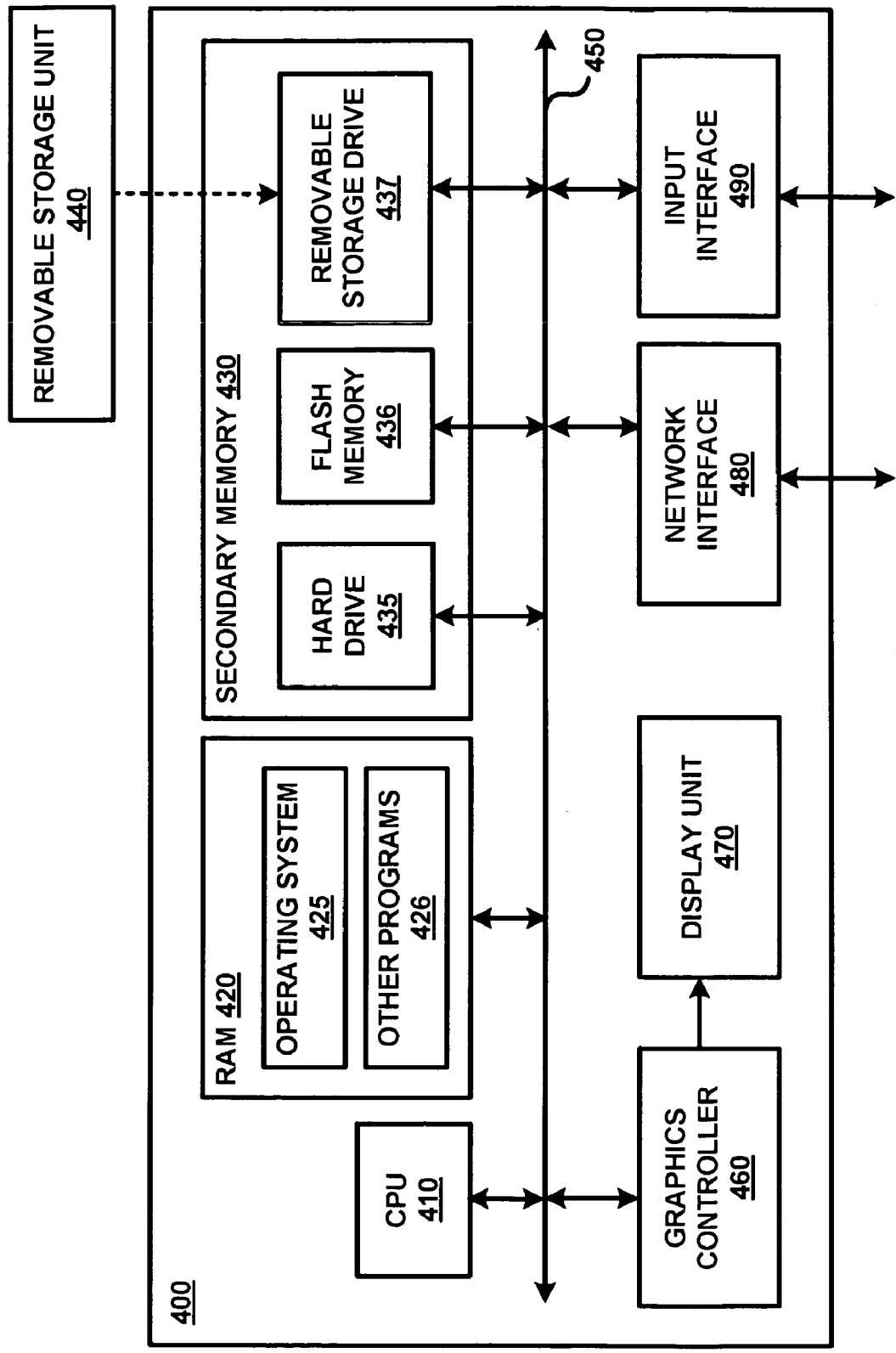
FIG. 4 is a block diagram illustrating the details of a digital processing system in which various aspects of the present invention are operative by execution of appropriate software instructions.
Figure 2:
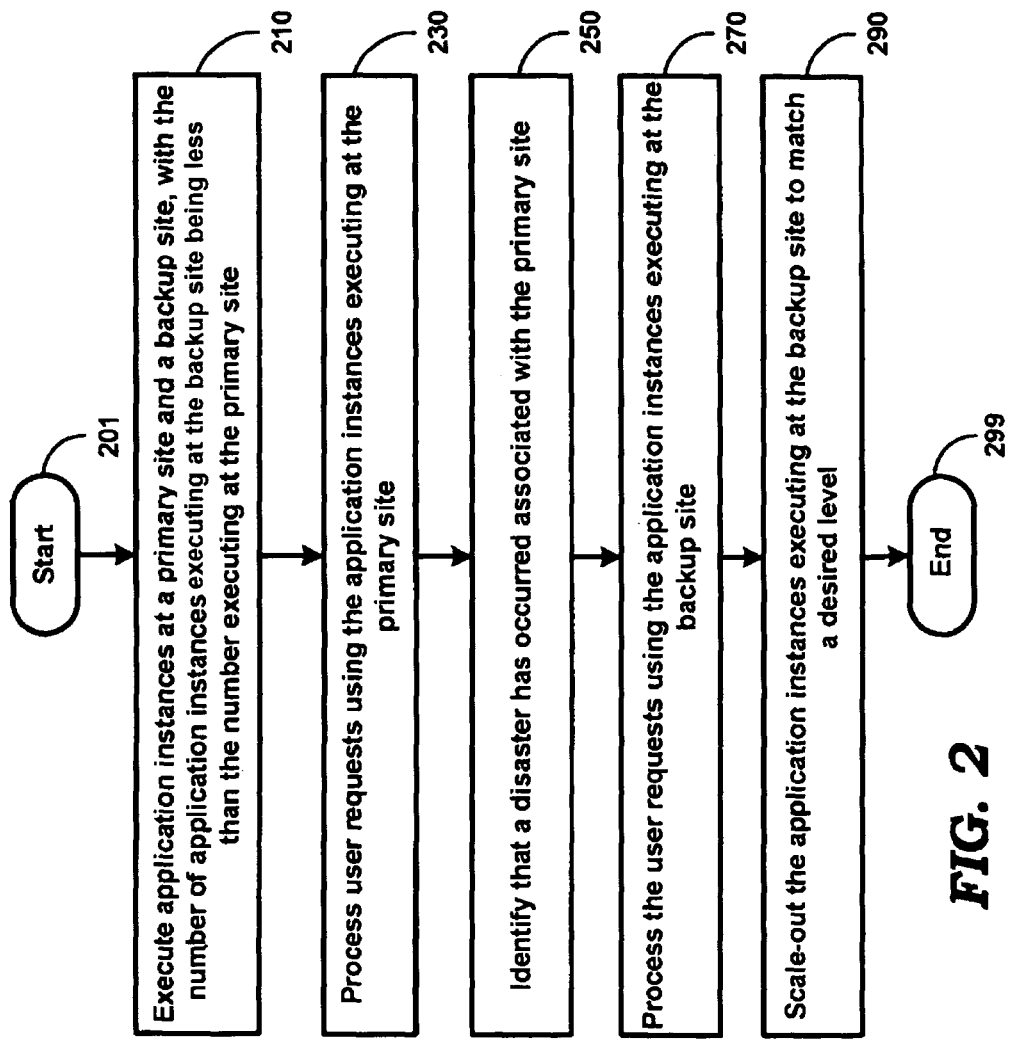

FIG. 4 is a block diagram illustrating the details of digital processing system 400 in which various aspects of the present invention are operative by execution of appropriate software instructions. Digital processing system 400 may correspond to scheduler 150B.

Digital processing system 400 may contain one or more processors such as a central processing unit (CPU) 410, random access memory (RAM) 420, secondary memory 430, graphics controller 460, display unit 470, network interface 480, and input interface 490. All the components except display unit 470 may communicate with each other over communication path 450, which may contain several buses as is well known in the relevant arts. The components of FIG. 4 are described below in further detail.

CPU 410 may execute instructions stored in RAM 420 to provide several features of the present invention. CPU 410 may contain multiple processing units, with each processing unit potentially being designed for a specific task. Alternatively, CPU 410 may contain only a single general-purpose processing unit.

RAM 420 may receive instructions from secondary memory 430 using communication path 450. RAM 420 is shown currently containing software instructions constituting operating system 425 and/or other code/programs 426 (such as a scheduling module providing the features of the flow chart of FIG. 2, client applications such as web browsers, load balancer/management applications, RDBMS, etc.). In addition to operating system 425, RAM 420 may contain other software programs such as device drivers, etc., which provide a (common) run time environment for execution of other code/programs.

Graphics controller 460 generates display signals (e.g., in RGB format) to display unit 470 based on data/instructions received from CPU 410. Display unit 470 contains a display screen to display the images defined by the display signals. Input interface 490 may correspond to a keyboard and a pointing device (e.g., touch-pad, mouse) and may be used to provide inputs. Network interface 480 provides connectivity to a network (e.g., using Internet Protocol), and may be used to communicate with other systems (such as request forwarder 125 and server systems 180A-180H of FIG. 1) connected to the network.

Secondary memory 430 may contain hard drive 435, flash memory 436, and removable storage drive 437. Secondary memory 430 may store the data (for example, the data shown in FIGS. 3A-3C) and software instructions (for example, constituting the enterprise application types designed to process user requests), which enable digital processing system 400 to provide several features in accordance with the present invention.

Some or all of the data and instructions may be provided on removable storage unit 440, and the data and instructions may be read and provided by removable storage drive 437 to CPU 410. Floppy drive, magnetic tape drive, CD-ROM drive, DVD Drive, Flash memory, removable memory chip (PCMCIA Card, EPROM) are examples of such removable storage drive 437.

Removable storage unit 440 may be implemented using medium and storage format compatible with removable storage drive 437 such that removable storage drive 437 can read the data and instructions. Thus, removable storage unit 440 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 440 or hard disk installed in hard drive 435. These computer program products are means for providing software to digital processing system 400. CPU 410 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

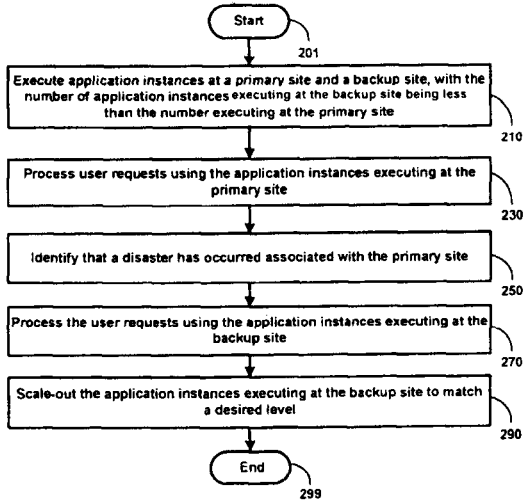

What is claimed is:

1. A disaster recovery system for processing user requests received from client systems, said disaster recovery system comprising:

a primary site containing a first set of nodes to process user requests during a normal operation of said disaster recovery system;

a backup site implemented as a cluster containing a second set of nodes, which are designed to be used in a standby state during said normal operation of said disaster recovery system, wherein said first set of nodes execute a first plurality of application instances and said second set of nodes execute a second plurality of application instances during said normal operation of said business organization, wherein a first set of user requests received during said normal operation are processed using only said first plurality of instances, wherein said second plurality of instances are used in a standby state during said normal operation, wherein said second plurality of application instances is fewer than said first plurality of application instances, upon identification of a disaster, said second set of nodes to process user requests using said second plurality of application instances instead of said first set of nodes, and to thereafter scale out said cluster to add a third set of nodes, wherein said second set of nodes and said third set of nodes together process user requests in a duration of said disaster.

2. The disaster recovery system of claim 1, wherein said backup site further contains a first scheduler designed to receive a first set of user requests and to distribute said first set of user requests among said second set of nodes immediately upon identification of said disaster, said first scheduler further designed to scale-out said cluster thereafter, said first scheduler designed to receive a second set of user requests and to distribute said second said user requests among said second set of nodes and said third set of nodes after said scale-out in said duration.

3. The disaster recovery system of claim 2, wherein said primary site is also implemented as another cluster containing a second scheduler, wherein said second scheduler is designed to receive a third set of user requests during said normal operation and to distribute said third set of user requests among said first set of nodes, said disaster recovery system further comprising:

a request forwarder to receive all user requests and forward each request to said second scheduler during said normal operation and to said first scheduler after identification of said disaster.

4. The disaster recovery system of claim 3, wherein said identification comprises determining that said second scheduler is not reachable based on a communication protocol implemented between said request forwarder and said second scheduler, wherein said request forwarder is designed to forward requests to said first scheduler upon said determining that said second scheduler is not reachable.

5. The disaster recovery system of claim 1, wherein said first set of nodes in said primary site executes application instances of a plurality of application types during said normal operation, wherein at least one application instance of each of said plurality of application types is also executed in said second set of nodes in said backup site during said normal operation.

6. The disaster recovery system of claim 5, wherein application instances are executed in the context of virtual machines at both said primary site and said backup site.

7. A method of reducing recovery time for a business organization in case of disasters, said method comprising:

maintaining a primary site and a backup site, said primary site containing a first set of nodes and said backup site containing a second set of nodes, wherein said second set of nodes in said backup site are implemented as a cluster;

executing a first plurality of application instances on said first set of nodes and a second plurality of application instances on said second set of nodes during a normal operation of said business organization, wherein said second plurality of application instances is fewer than said first plurality of application instances;

processing a first set of user requests received during said normal operation using only said first plurality of application instances, wherein said second plurality of application instances are used in a standby state during said normal operation;

identifying that a disaster has occurred associated with said primary site;

processing a second set of user requests received immediately after identification of said disaster using only said second plurality of application instances.

8. The method of claim 7, wherein recovery time for said business organization is reduced due to said executing said second plurality of application instances in said standby state during said normal operation and then processing said second set of user requests using said second plurality of application instances immediately after said identification of said disaster.

9. The method of claim 8, further comprising:

scaling out said cluster to add a third set of nodes executing a third plurality of application instances; and processing a third set of user requests received after said scaling out, using said second plurality of application instances and said third plurality of application instances.

10. The method of claim 9, wherein said scaling out is performed a plurality of times in a phased manner until the total number of application instances executing in said backup site equals a desired percentage of the number of application instances that were executing in said primary site before said disaster.

11. The method of claim 10, wherein said desired percentage equals 100, whereby the execution state of said primary site is recreated in said backup site.

12. The method of claim 9, wherein said first set of nodes in said primary site is implemented as another cluster, said method further comprising:

using a first scheduler in said another cluster at said primary site to perform said executing said first plurality of application instances, said processing said first set of user requests; and using a second scheduler in said cluster at said backup site to perform said executing said second plurality of application instances, said processing said second set of user requests, said scaling out and said processing said third set of user requests.

13. The method of claim 12, wherein said identifying is performed in a request forwarder provided external to said primary site and said backup site.

14. The method of claim 9, wherein said first set of nodes in said primary site executes application instances of a plurality of application types during said normal operation, wherein at least one application instance of each of said plurality of application types is also executed in said second set of nodes in said backup site during said normal operation.

15. The method of claim 14, wherein said application instances are executed in the context of virtual machines at both said primary site and said backup site.

16. A non-transitory machine readable medium storing one or more sequences of instructions for causing a scheduler system to reduce recovery time for a business organization in case of disasters, said scheduler system being provided in a backup site corresponding to a primary site, said primary site being used during normal operation of said business organization, wherein execution of said one or more sequences of instructions by one or more processors contained in said scheduler system causes said scheduler system to perform the actions of:

executing a second plurality of application instances on a first set of nodes at said backup site, wherein said second plurality of application instances are used in a standby state during said normal operation, wherein said second plurality of application instances is fewer than the number of application instances executing at said primary site during said normal operation; and processing a second set of user requests received immediately after identification of occurrence of a disaster using said second plurality of application instances, whereby recovery time for said business organization is reduced due to said executing said second plurality of application instances in a standby state during said normal operation and then processing said second set of user requests using said second plurality of application instances immediately after identification of said disaster.

17. The non-transitory machine readable medium of claim 16, further comprising:

adding a third set of nodes executing a third plurality of application instances at said backup site; and processing a third set of user requests received after said adding, using said second plurality of application instances and said third plurality of application instances.

18. The non-transitory machine readable medium of claim 17, wherein said backup site is implemented as a cluster, wherein said adding comprises scaling out said cluster.

19. The non-transitory machine readable medium of claim 18, wherein said scaling out is performed a plurality of times in a phased manner until the total number of application instances executing in said backup site equals a desired percentage of the number of application instances that were executing in said primary site before said disaster.

20. The non-transitory machine readable medium of claim 19, wherein said desired percentage equals 100, whereby the execution state of said primary site is recreated in said backup site.

* * * * *

UNITED STATES PATENT AND TRADEMARK OFFICE
CERTIFICATE OF CORRECTION

| | |
|---|---|
| PATENT NO. | : 8,112,659 B2 |
| APPLICATION NO. | : 12/487818 |
| DATED | : February 7, 2012 |
| INVENTOR(S) | : Agneeswaran et al. |

It is certified that error appears in the above-identified patent and that said Letters Patent is hereby corrected as shown below:

The title page showing the illustrative figure should be deleted to be replaced with the attached title page.

In the drawing sheets, consisting of Fig. 2, should be deleted to be replaced with the drawing sheet, consisting of Fig. 2, as shown on the attached page.

In column 6, line 64, delete "factilitate" and insert -- facilitate --, therefor.

In column 7, line 3, delete "mulitple" and insert -- multiple --, therefor.

In column 7, line 16, delete "to to" and insert -- to --, therefor.

In column 7, line 67, delete "acessibility" and insert -- accessibility --, therefor.

Signed and Sealed this
Fifteenth Day of May, 2012

David J. Kappos
*Director of the United States Patent and Trademark Office*

(12) United States Patent
Agneeswaran et al.

(10) Patent No.: US 8,112,659 B2
(45) Date of Patent: Feb. 7, 2012

(54) REDUCING RECOVERY TIME FOR BUSINESS ORGANIZATIONS IN CASE OF DISASTERS

(75) Inventors: Vijay Srinivas Agneeswaran, Bangalore (IN); Hariprasad Nellitheertha Venkataraja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 272 days.

(21) Appl. No.: 12/487,818

(22) Filed: Jun. 19, 2009

(65) Prior Publication Data
US 2010/0325473 A1 Dec. 23, 2010

(51) Int. Cl.
*G06F 11/00* (2006.01)
(52) U.S. Cl. .......... 714/4.11; 714/4.12; 714/13
(58) Field of Classification Search .......... None
See application file for complete search history.

(56) References Cited

U.S. PATENT DOCUMENTS

| | | | | |
|---|---|---|---|---|
| 5,996,001 | A * | 11/1999 | Quarles et al. | 709/203 |
| 6,393,485 | B1 * | 5/2002 | Chao et al. | 709/231 |
| 6,597,956 | B1 * | 7/2003 | Aziz et al. | 700/3 |
| 7,080,378 | B1 * | 7/2006 | Noland et al. | 718/104 |
| 7,124,320 | B1 * | 10/2006 | Wipfel | 714/13 |
| 7,370,099 | B2 | 5/2008 | Hara et al. | |
| 2003/0233602 | A1 * | 12/2003 | Lindquist et al. | 714/47 |
| 2004/0064548 | A1 * | 4/2004 | Adams et al. | 709/224 |
| 2004/0103338 | A1 * | 5/2004 | Chalasani et al. | 714/4 |
| 2004/0243915 | A1 * | 12/2004 | Doyle et al. | 714/796 |
| 2004/0267920 | A1 * | 12/2004 | Hydrie et al. | 709/223 |
| 2006/0031843 | A1 | 2/2006 | Romero | |
| 2006/0190775 | A1 | 8/2006 | Aggarwal et al. | |
| 2008/0040535 | A1 | 2/2008 | Fisher et al. | |
| 2008/0126404 | A1 | 5/2008 | Slik et al. | |
| 2008/0250267 | A1 * | 10/2008 | Brown et al. | 714/4 |
| 2009/0006888 | A1 * | 1/2009 | Bernhard et al. | 714/6 |

OTHER PUBLICATIONS

"Applogic—Grid Operating System for Web Applications", "http://www.3tera.com/AppLogic/", Downloaded Circa: Oct. 24, 2008, pp. 1-1.
"Disaster Recovery for Core Network Services", "http://www.infoblox.com/solutions/disaster_recovery.cfm", Downloaded Circa: Oct. 24, 2008, pp. 1-3.
"Kato Masayuki", "Grid Technology Applied to Disaster Recovery", NEC Technical Journal, vol. 1, No. 4/2006, pp. 58-61.
"Here Comes the "Windows Cloud"", http://www.roughtype.com/archives/2008/10/amazons_cloud_n.php Downloaded Circa: Oct. 24, 2008, pp. 1-6.

(Continued)

*Primary Examiner* — Gabriel Chu
(74) *Attorney, Agent, or Firm* — Narendra Reddy Thappeta

(57) ABSTRACT

An aspect of the present invention reduces the recovery time for business organizations in case of disasters. In one embodiment, a disaster recovery system containing a primary site and a backup site (implemented as a cluster) is maintained. Application instances are executed in both the primary site and the backup site, with the number of instances executed on the backup site being fewer than that executed on the primary site. During normal operation, user requests received are processed using only the instances executing in the primary site, while the instances executing in the backup site are used in a standby state. On identifying that a disaster has occurred, the user requests received immediately after identification of the disaster are processed using only the instances executing in the backup site. The cluster at the backup site is then scaled out to add application instances until a desired level/percentage is achieved.

20 Claims, 4 Drawing Sheets